(12) United States Patent
Graichen et al.

(10) Patent No.: US 8,120,463 B2
(45) Date of Patent: Feb. 21, 2012

(54) RFID PROTOCOL FOR IMPROVED TAG-READER COMMUNICATIONS INTEGRITY

(75) Inventors: Catherine Graichen, Malta, NY (US); Timothy Lee Johnson, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1446 days.

(21) Appl. No.: 11/619,902

(22) Filed: Jan. 4, 2007

(65) Prior Publication Data

US 2008/0165003 A1    Jul. 10, 2008

(51) Int. Cl.
*H04Q 5/22* (2006.01)

(52) U.S. Cl. .................. 340/10.1; 340/572.1

(58) Field of Classification Search .............. None
See application file for complete search history.

(56) References Cited

U.S. PATENT DOCUMENTS

| 5,811,910 | A | 9/1998 | Cameron et al. |
| 5,914,671 | A * | 6/1999 | Tuttle ................. 340/10.42 |
| 5,970,794 | A | 10/1999 | Yoshida |
| 6,031,317 | A | 2/2000 | Chen |
| 6,255,962 | B1 | 7/2001 | Tanenhaus et al. |
| 6,452,504 | B1 | 9/2002 | Seal |
| 6,469,639 | B2 | 10/2002 | Tanenhaus et al. |
| 6,532,834 | B1 | 3/2003 | Pinto et al. |
| 6,622,657 | B2 | 9/2003 | Northrop et al. |
| 6,737,979 | B1 | 5/2004 | Smith et al. |
| 7,327,218 | B2 * | 2/2008 | Hohberger et al. .......... 340/10.1 |
| 7,633,377 | B2 * | 12/2009 | Sadr ................. 340/10.1 |
| 2004/0066278 | A1 * | 4/2004 | Hughes et al. ............... 340/10.1 |
| 2006/0077039 | A1 * | 4/2006 | Ibi et al. .................. 340/10.1 |
| 2008/0048835 | A1 * | 2/2008 | O'Toole et al. ............. 340/10.4 |
| 2008/0074239 | A1 * | 3/2008 | Usami ..................... 340/10.4 |
| 2008/0169909 | A1 * | 7/2008 | Park et al. ................. 340/10.4 |

FOREIGN PATENT DOCUMENTS

| JP | 2001291181 | 10/2001 |
| JP | 2004294561 | 10/2004 |
| WO | WO/0122118 | 3/2001 |

(Continued)

OTHER PUBLICATIONS

Daniel W. Engels, On the Probability of Ghost Reads in an RFID System, Jan. 2005, Auto-ID Laboratories Massachusetts Institute of Technology, MIT Auto-ID Labs Technical Report, MIT-AUTOIDLABS-TR-002, p. 1-8.*

(Continued)

*Primary Examiner* — Jennifer Mehmood
*Assistant Examiner* — Brian Wilson
(74) *Attorney, Agent, or Firm* — Scully, Scott, Murphy & Presser, PC (57) ABSTRACT

The present invention provides a means by which the reliability of communication between any RFID reader and tag in an RFID system is improved by using an "interleaved parity" algorithm. The improved reliability is obtained by computing, on one RFID device, an interleaved parity code for a message, sending the message with the code from the RFID device, receiving the message on the other RFID device which computes another interleaved parity code for the received message. The two parity codes are compared and if the codes are the same, the message can be parsed and interpreted. If the codes indicate that one bit of the message is incorrect, the incorrect bit is corrected and the message is parsed and interpreted. Otherwise, a request for a new message is sent to the RFID device, and, if appropriate, an indication of two erroneous bits is also sent.

28 Claims, 2 Drawing Sheets

FOREIGN PATENT DOCUMENTS

| | | |
|---|---|---|
| WO | WO/02061657 | 8/2002 |
| WO | WO/03036807 | 5/2003 |
| WO | WO/03037662 | 5/2003 |
| WO | WO/2004102327 | 11/2004 |
| WO | WO/2004109583 | 12/2004 |

OTHER PUBLICATIONS

Dept. of Computer Science Rutgers University, CS352- Link Layer, 2005, slides 1-24.*

Leslie Jill Miller, The ISO Reference Model of Open Systems Interconnection: A First Tutorial, Nov. 9-11, 1981, Xerox, 283-288.*

Hamming, R. W., Error-Correcting Codes, Coding and Information Theory, 1980, pp. 35-43, Prentice-Hall, Inc., Englewood Cliffs, New Jersey.

Hamming, R. W., Algebraic Coding Theory, Coding and Information Theory, 1980, pp. 195-200, Prentice-Hall, Inc., Englewood Cliffs, New Jersey.

* cited by examiner

RFID PROTOCOL FOR IMPROVED TAG-READER COMMUNICATIONS INTEGRITY

BACKGROUND OF THE INVENTION

1. Field of the Invention

This invention relates to the field of radio frequency identification (RFID) and, more particularly, to improved reliability of communication between any RFID reader and tag in an RFID system.

2. Discussion of the Prior Art

RFID systems exhibit unique communications reliability issues. Communication in RFID systems is normally initiated by the transmission of a carrier signal from the reader to the tag. However, this communication could also be from the tag to the reader. Reliability issues arise due to the relatively high instability of the RF field strength, the relatively error-prone decoding of received signals at both the reader and tag, and the uncertainty in the timing of the carrier detection. RF field strength may become insufficient and/or may fluctuate frequently. The RF field strength instability is evidenced, for example, if the carrier signal amplitude or quality is degraded by, for instance, movement of the reader relative to the tag. Degraded carrier signal quality can cause the integrity of the transaction to be lost, resulting in an incorrectly received message and, if the error is detected, necessitating retransmission of the entire transaction or message. In addition, it is common for RFID systems to be operated close to the limits of their range, so that even in the absence of movement, the RF field strength may vary, causing a high bit error rate of the receiving device, either the reader or the tag.

Another communications reliability issue arises due to the uncertainty in the timing of carrier detection relative to the start of reading or transmission. This uncertainty can give rise to a shifting, or partial shifting, of a carrier or message acknowledgement bit stream, and can cause the failure of standard message parsers, which may not be equipped to handle this shifting bit stream. In passive tags, where the carrier also supplies energy and/or a signal path for the response of the tag, this shifting can be acute, resulting not only in misinterpretation of the reader's request, but also in an inappropriate response by the tag, causing a two-way communications failure. In active tags, the communication requests between the reader and the tag may be more complex, requiring specific tasks for the reader to validate the results received from the tag and for the tag to validate requests from the reader.

Communications reliability in RFID systems is addressed in WO 2004/109583 for "Wireless Communications Device, System and Communications Method". A method to overcome RF interference and distinguish signals from multiple RFID tags within the range of one reader is disclosed, including a technique for frequency-shift-key (FSK) encoding for use in the communications protocol of the RFID reader/transponder. The application discloses that its system can be used with transceiver sensor data.

A communication system protocol used to distinguish among multiple RFID tags is disclosed in U.S. Pat. No. 6,452,504 B1 for "System and Method for Communication with Radio Frequency Identification Tags Using TOW Message DFM Protocol". This patent describes a protocol for use in a home monitoring environment, using directional location based on reception of a three-phase AC signal. The protocol, which is somewhat unique to the home monitoring environment, requires the use of an antenna on the RFID transponder. The patent discloses actually estimating the relative location and/or direction of several transponders with respect to a given transmitter. The patent discloses sensors and RFID tags among its applications.

Present RFID systems address the communications reliability issue in a variety of ways, such as by increasing the reader's carrier signal strength or amplitude, by using large or more efficient antennas, by using data encoding schemes, such as differential bi-phase or Manchester encoding, within the protocol, or by continuously retransmitting. These techniques frequently result in high energy consumption at the reader, often limiting the use of portable readers, and also in RF interference of the RFID system when its signal is injected into receivers, e.g., intermediate stage receivers, for other RF systems in a location. All of these methods reduce throughput and may require manual intervention by the user in order to achieve reliable transmission. Presently deployed RFID applications are predominantly single-reader, single-tag applications, with "passive" RFID tags; the present invention is particularly suitable for multi-reader, multi-tag environments and/or for "active" tags. An "active" tag is one that responds with more than simply "identity" information, and may respond to different reader commands with different types of messages, and/or carry on a multi-step "transaction" with the reader.

BRIEF SUMMARY OF THE INVENTION

The present invention advantageously provides a means by which the reliability of communication between any RFID reader and tag in an RFID system can be improved by the use of an "interleaved parity" algorithm to solve the above problems in the prior art. The improved reliability of communication can be obtained by computing, on either the RFID reader or RFID tag, an interleaved parity code for a message, sending the message with the code from the RFID device, receiving the message on the other RFID device wherein another interleaved parity code is computed for the received message. The two parity codes are compared to each other. If the codes are the same, the sent message is the same as the received message, which can then be parsed and interpreted. If the codes indicate that one bit of the message is incorrect, the incorrect bit is corrected and the message is parsed and interpreted. If the comparison indicates that an error has occurred in two bits of the message, a request for a new message along with an indication of the erroneous two bits is sent to the RFID device. If the comparison indicates that more than two bits have errors, a new message is requested from the RFID device.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

The unique requirements of RFID applications, and particularly multi-reader, multi-tag and active RFID transactions, dictate that the transaction level protocol reflect the limitations of RFID systems. Because of the relatively high instability of the RF field strength and relatively error-prone decoding of received signals at both the reader and tag, transactions need to be limited to a minimum number of message types, with relatively short arguments or data. At the same time, messages need some level of redundancy suitable for graceful error recovery. In particular, at any time, the RF field strength may become insufficient, and/or may change at a high rate, resulting in the termination of a transaction and the need to re-start everything. Under these conditions, it is possible that the reader and tag will be interrupted, causing them to terminate while they are at different stages of the transaction. The inventive RFID communication system enables, so much as possible, the correction of transmission errors to occur automatically without involvement of the user of the reader.

Although RFID technology is well developed, and the method of interleaved parity is well known for coding applications, the two have not been successfully combined. The combination of RFID technology with interleaved parity is not a simple combination of two known technologies, but is based on specific, expert knowledge of RFID applications, where it offers unique advantages as described herein. These problem-specific advantages are much larger than would be obtained in a "typical" coding application of interleaved parity.

Reference will now be made in detail to the preferred embodiments of the present invention, examples of which are illustrated in the accompanying drawings. The examples illustrate an "active" RFID protocol for a single reader, multiple tag application. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The invention solves the RFID transmission reliability problem by using the method of interleaved parity to enable the reader/tag system to detect two-bit transmission errors, and to correct any single bit error in the message immediately after it is received. With this inventive approach, in many cases, a message can be corrected and parsed without requiring either an error message to the reader or a retransmission. Furthermore, the method of interleaved parity effectively computes a multi-rate sampled parity of the message by creating multiple parity bits for special subsets of the transmitted data bits, which is particularly robust to missing or shifted bits, to periodic, e.g. RF modulation, disturbances in the received waveform, and to brief interruptions or distortions of the RF carrier (drop-out), and therefore is well suited for the particular types of disturbances that are encountered in RFID applications. Methods for encoding, decoding, and correcting interleaved parity signature are relatively efficient in terms of code-space and time, and hence can be performed on both reader and tag without undue strain on resources. Furthermore, these methods can be implemented in real time using current technology, so that a decision can be made concerning the message accuracy between the time of message receipt and reply to the message. This is particularly useful for improving transaction integrity in RFID applications, since automatic correction can occur in very short times that do not disrupt the user's transaction.

The invention works by computing an interleaved parity code that is transmitted following a message sent by the reader to the tag and/or by the tag to the reader. The preferred method is to append the interleaved parity signature in both directions. Interleaved parity is a known method that is described, for instance, in Hamming, Richard W., *Coding and Information Theory*, Prentice-Hall, Inc., Englewood Cliffs, N.J., 1980, in particular section 11.3. Interleaved parity involves computing a parity "signature" for a message where each bit of the signature is based on computing parity of selected bits of the message, e.g., every n-th bit for the $n^{th}$ bit of the signature; in effect, the message is parity-checked at multiple sampling rates in the same process. By its nature, this coding method gives rise to an incidental but valuable property sometimes termed "time-diversity" that, in the context of an RF carrier transmission, makes the encoding particularly robust to signal distortions such as fading, drop-out, and source movement effects, and interference from multiple transmitters, all of which are characteristic of RFID applications.

Very efficient methods are known for detecting and correcting bit errors using interleaved parity. When a message is received, its interleaved parity signature is calculated and compared with that which is transmitted with the message, and if an error exists, the message can then be corrected. In its simplest form, the method has been shown to be capable of detecting two-bit errors, and of correcting any one-bit error in a message. The corrected message is then parsed and interpreted. When a reply to a message is generated, the same process is used, that is, the interleaved parity signature is computed, and appended to the message prior to its transmission back to the original sending device.

Since RFID messages are typically assumed to be relatively short, only a few parity bits must be appended to each message. The number of parity bits required for single bit detection is defined as $2^m >= n+1$ where m=number of parity bits and n is total number of bits in the message including the parity bits. To provide single bit correction and 2-bit detection, an additional overall parity bit is added to the required number of parity bits. So for example, seven parity bits+1 overall parity bit can check messages of length 119 bits (127−7−1) since $2^7 >= 127+1$. The reliability of the approach may be further improved by means such as defining commands where a single bit error in a command string cannot be misinterpreted for another command, so that in the unlikely event that compensating bit errors have occurred in both the signature and the original message bits, the parser will accurately detect this error (e.g., Gray-coding of commands). In addition, reliability of the communication is enhanced for active tags by having the tag reflect or return the command or request for data from the reader with the data result. Under this approach, parity checks for the response may be applied only to the returned data as the original command already includes parity check bits.

Figure 1:
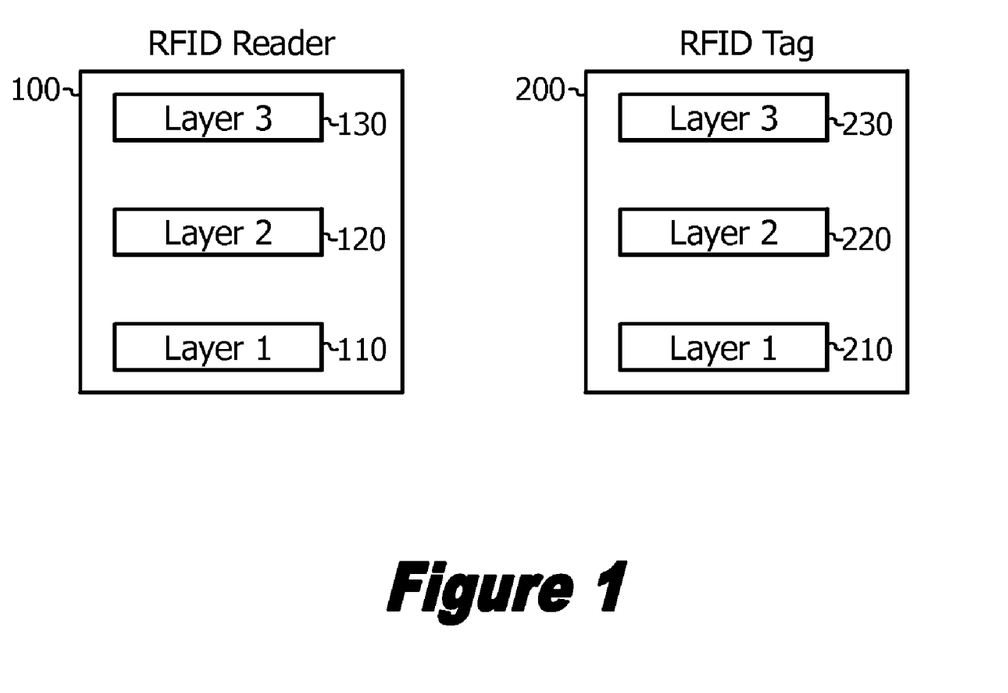
FIG. 1 is a schematic diagram of an exemplary embodiment of the invention.

An exemplary embodiment of the present inventive system and method includes the signal interface between an RFID reader 100 and RFID tag 200 and also includes three "layers" in both the reader and tag, as shown in FIG. 1. In this exemplary embodiment, only a single reader and a single tag are present in the target system. However, the transaction protocol is not limited to this embodiment and can be consistent with a multi-reader, multi-tag environment.

In this exemplary embodiment, a set of up to eight 32-bit data registers are used for tag-reader communications. The Layer 2 protocol controls reading and writing to these registers. Data written to the registers may be commands that modify other data stored within the tag as well as the data within the registers. However, the transaction protocol is not limited to this embodiment and can be consistent with other underlying implementations including different data register sizes or number.

According to ISO standard digital communication practices, protocols are usually defined in layers. In receiving a message, each layer is usually decoded sequentially; in sending a message, each layer is normally encoded in the reverse order. The three layers of interest in this work are illustrated in FIG. 1. A protocol is termed "symmetric" when the same encoding method is used for both directions of a (bidirectional) channel, and "asymmetric" when different encoding methods are used to send and receive. Layers 1 (110, 210) and 2 (120, 220) of the exemplary protocol are asymmetric; Layer 3 (130, 230) should be essentially symmetric. The application layer messaging protocol, Layer 3, of the inventive system and method provides the improved reliability of communication between the reader and the tag.

Layer 1 (110, 210) consists of both RF and inductance modulation, and the serialization of a message using Manchester encoding/decoding. The analog encoding of a RFID technology necessitates that Layer 1 is inherently asymmetric in the carrier band, because this technology imposes significant energy and RF signal requirements, because the incident RF energy is also used to power the return signal path, and because the mere presence of the reader's RF carrier in the vicinity of the tag may be used to initiate communications. The Layer 1 tag protocol is implemented by sending a signal that modulates the effective mutual inductance of the tag. This signal is relatively weak, which, along with other factors, can cause difficulties in detecting the start of message, so the message may need to be broadcast repeatedly from the tag until it is successfully received.

The Layer 2 protocol (120, 220) is a basic messaging protocol, sometimes considered to be part of a "data link" layer; it is also asymmetric. The Layer 2 command sent from the tag consists of an initial message separator, followed by a command word that may indicate the size of data to follow, followed by data words with or without delimiters and a final terminator. The incoming Layer 2 response consists of an initial message separator, followed by a bit stream, followed by a terminator. The interpretation of the received bit stream includes the command to be executed, such as reset, read, or write. Additional command-specific parameters are also included in the bit stream that may describe how the Layer 1 encoding should be performed. Different embodiments may send the data and command bits in the original order, pad them, reverse them, etc., but each embodiment and application will define the specific conventions. The Layer 2 message receiving/transmitting process is made additionally complex since sending and receiving may occur simultaneously. The Layer 2 protocol can have elements of a master-slave protocol, such that the transponder does not "speak unless spoken to" by the reader where presence of a field carrier is used to "wake up" the transponder. Thus, a true "response" will always follow a correctly received "command".

An exemplary Layer 2 message syntax, as shown in Table 1, consists of:

- An initialization command to be performed before EACH function.
- A software reset command to reinitialize the Layer 2 protocol at the reader.
- An acknowledgement that the Layer 2 protocol at the reader is ready to accept a command.
- Board/hardware control functions, particularly, turning the RF field on and off.
- A read the transponder broadcast command, acknowledged immediately by a datagram containing the length of data and up to 8×32 bits of data.
- A write to the transponder command, acknowledged by a 4-byte acknowledgement from the Layer 2 protocol at the reader; this may not guarantee that the write was successful, only that the write request was received and understood.
- An error acknowledgement of uniquely recognizable bytes (not confused with a command confirmation or data response), in the event that either read or write command is unsuccessful, as detected by the Layer 2 (120) protocol at the reader.

TABLE 1

Reader Layer 2 protocol summary

| Command | Sample Hex Command | Expected Hex Response for Success | Layer 1 Bitstream Transmission (if appropriate) |
| --- | --- | --- | --- |
| Initialize | 00 | 08 00 AA 04 | |
| Software Reset | FF FF FF FF FF FF FF FF FF | 08 00 AA 04 | |
| Field Off | 9F | 08 00 9F 04 | |
| Field On | 90 | 08 00 90 04 | |
| Read | C8 01 90 05 F0 06 90 0A 00 0A A0 0E 10 E6 51 | E0 00 07 00 00 B7 06 00 00 B6 05 00 00 B5 04 00 00 B4 03 00 00 B3 02 00 00 B2 01 00 00 B1 04 Assuming blocks 1–7 returned and contain: B1 00 00 01 B2 00 00 02 B3 00 00 03 B4 00 00 04 B5 00 00 05 B6 00 00 06 B7 00 00 07 | |
| Write | 80 0D F8 30 FD 80 F6 30 26 | 80 00 0F 04 | 10 0 1010 1011 1100 |

TABLE 1-continued

Reader Layer 2 protocol summary

| Command | Sample Hex Command | Expected Hex Response for Success | Layer 1 Bitstream Transmission (if appropriate) |
|---|---|---|---|
| | 89 1E F6 7A A4 | and AB CD EF 12 written in <<block>> 1. | 1101 1110 1111 0001 0010 001 00 Assuming 5551 |

In an exemplary embodiment, the tag 200 is not an active tag, but transmits its blocks continuously when powered unless interrupted for a write command. The number of blocks returned are configured on the tag by previously writing the desired block in block 0; choices are to return block 0, block 1, block 1-2, block 1-3, . . . , block 1-7. When the Layer 2 (120) protocol at the reader receives a read command, it synchronizes with the broadcast from the tag, either by header or sequence terminator, and formats the bits of the block data into the return read acknowledgement. A write command interrupts the broadcasting to replace the contents of one of the blocks. After the write is completed, the tag resumes broadcasting its data as configured by block 0.

In an exemplary embodiment, the Layer 3 protocol is an active tag based oil the passive tag Layer 2 protocol that uses sequence terminators. Headers are not used, as they would severely limit how data is stored in the blocks since the header cannot appear in the data, including shifted data.

An exemplary list of top-level Layer 3 transactions is shown in Table 2. The Layer 3, or transactions level, protocol specification consists of a set of messages that pass between the reader 100 and tag 200 in a particular time-sequence in order to accomplish a basic reader function, such as reading the Tag ID. The Layer 3 protocol, in the exemplary embodiment, will also assign codes and interpretations to basic Layer 2 protocol upon which it is superimposed. The Layer 3 protocol will also define simple but appropriate actions to be taken in the event that various errors are detected at either the reader or the tag, with a goal of achieving 100% deterministic operation under all circumstances, i.e., transmission failure at or above Layer 2, at either the reader or the tag.

The Layer 3 protocol defines three basic commands: read, write and execute. For each command, a specific data element is identified, for instance, read and sensor peak. Data elements may be further qualified by an index when the application has multiple elements for that data type. In the example shown in table 2, seven sensor events per message are allowed. The type and number of data elements is a function of the application and the total available storage on the tag.

Each data element may return different length data. In some applications, the length will be known based on the data type. For others, the reply will need to specify the data length. In addition, each application will determine if the data element is read only or can be set or cleared.

TABLE 2

Reader Layer 3 Transaction summary

| Command or Data Type | Command Gray Code | Binary Gray Code | Indexes (or length returned) | Bits of data | Read | Clear | Set |
|---|---|---|---|---|---|---|---|
| Command Types | | | | | | | |
| Read | 1 | 001 | | | | | |
| Write | 2 | 010 | | | | | |
| Execute | 4 | 100 | | | | | |
| Data Types | | | | | | | |
| UID | 2 | 0 0010 | 0 | 96 | Y | Y | Y |
| Asset UID | 4 | 0 0100 | 0 | 96 | Y | Y | Y |
| Sensor Peak | 7 | 0 0111 | 7 | 32 | Y | Y | N |
| Sensor Peak Count | 8 | 0 1000 | 7 | 16 | Y | ? | N |
| Sensor Limit | 11 | 0 1011 | 7 | 7 | Y | Y | Y |
| Battery Power Remaining | 13 | 0 1101 | 1 | 7 | Y | N | N |
| Current Time | 14 | 0 1110 | 1 | 32 | Y | N | N |
| Last Read Time (most significant bit is Red/Green status) | 16 | 1 0000 | 1 | 32 | Y | Y | Y |
| Location (20 chars) | 19 | 1 0011 | 1 | 160 | Y | Y | Y |
| Reset Data | 21 | 1 0101 | 0 | 0 | N | Y | N |

The Layer 3 protocol (230) of the active tag can be achieved by using the Layer 2 write commands to send a Layer 3 read command. This instructs the tag by describing what data should be returned. The tag can then copy it to the data register or perform any other preparation required prior to transmitting it. In the tag of the exemplary embodiment, any data or block address can be chosen, provided the tag and reader agree. The data written must provide the tag with the steps to follow, and thus will include the command definition, e.g., "Read Sensor Peak 3".

To change data on the tag, a Layer 2 write command is sent with a Layer 3 write command containing the command data type, data index followed by the data to save that will be of the correct length, e.g "Write the following data to Sensor Limit 2".

Figure 2:
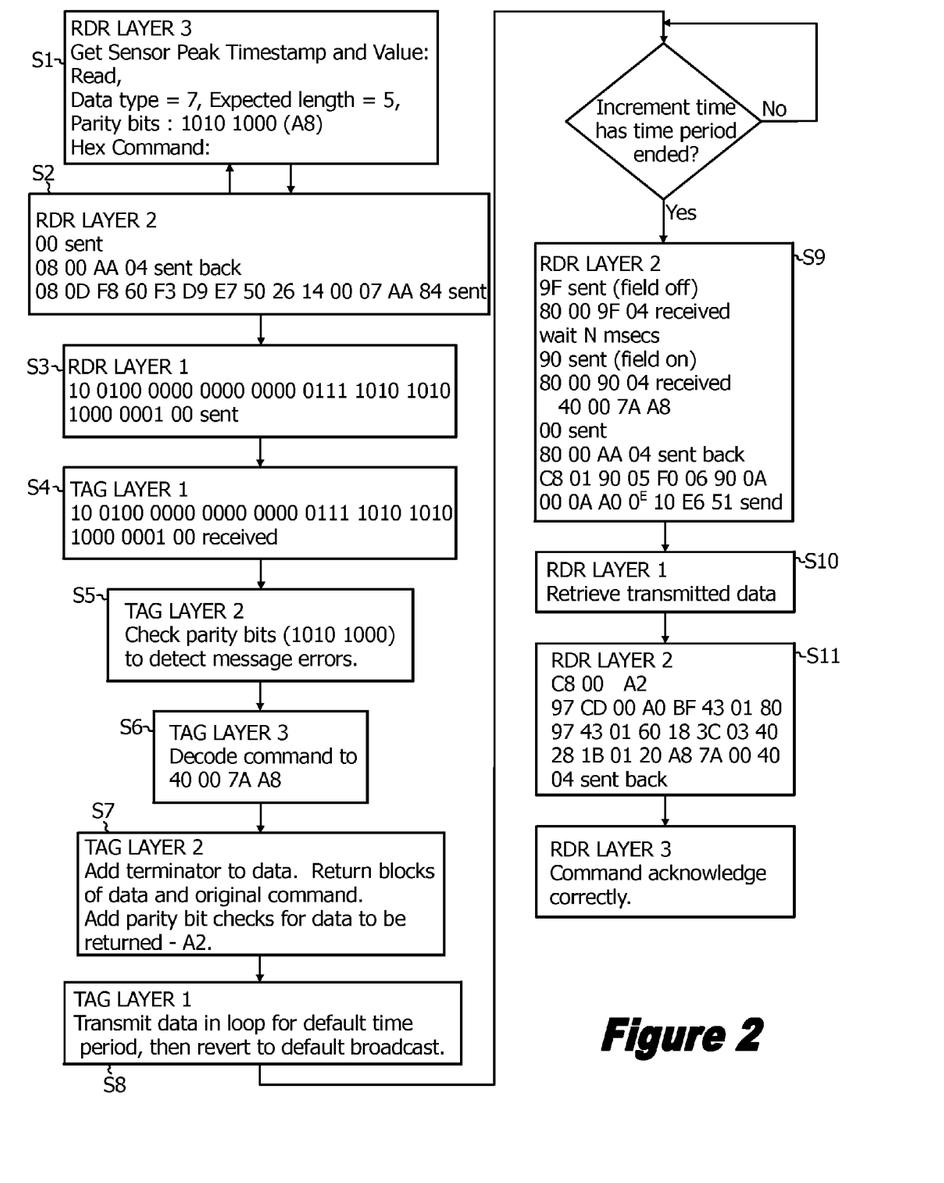
FIG. 2 is a diagram of steps in an exemplary embodiment of the invention.

FIG. 2 shows a transaction or sequence of actions that might occur when the application (an "active" RFID tag, variable message-length transaction) consists of storing sensor values in the tag and extracting them with a hand-held computer. The figure shows how sensor values are to be read. In Step S1, Reader Layer 3 issues a command to get or READ SENSOR PEAK "timestamp and value." As shown in Table 2, the READ command is code 001, and the SENSOR PEAK data type is code 7, or binary code 0 0111, which has 32 bits of data. Accordingly, the data to be sent is the hex command 40 00 7A A8 including the appended parity code of 1010 1000 (A8). In Step S2, the reader Layer 2 sends a 00 initialize command to clear the communications channel. When successful, the confirmation 08 00 AA 04 is returned. Reader Layer 2 receives the data from Reader Layer 3. Reader Layer 2 prepares and sends the data message from Reader Layer 3 to Reader Layer 1. In Step S3, Reader Layer 1 sends the data message to Tag Layer 1, and, in Step S4, Tag Layer 1 receives this data. In Step S5, Tag Layer 2 checks the parity bits of the code received by Tag Layer 1, to determine whether the information received contained any errors. In Step S6, Tag Layer 3 decodes the hexadecimal (hex) command from the data message received by Tag Layer 2 and retrieves the requested data to transmit back. In Step S7, Tag Layer 2 adds terminator information to the data, returns blocks of data along with the original hex command and adds parity bit checks for the data to be returned. In Step S8, Tag Layer 1 transmits the data from Tag Layer 2 to the Reader, the data continues to be transmitted repeatedly for a predefined time period. Once the time period has ended (or another request from the reader is received), the Tag reverts to transmitting its default broadcast. In Step S9, Reader Layer 2 transmits a Field OFF message (9F) which causes the Reader board to stop the RF field. If successful, then Reader Layer 1 returns the confirmation code 80 00 9F 04. After waiting several milliseconds, Reader Layer 2 transmits a Field ON message (90) which causes the Reader board to restart the RF field. If successful, then the Reader Layer 1 returns the confirmation code 80 00 90 04, Reader Layer 3 then requests to read the data from the tag. Reader Layer 2 then sends an initialization or reset message back to the Tag, receives the confirmation from Reader Layer 1, and then sends the "read" command to Reader Layer 1. In Step S10, Reader Layer 1 receives the data transmitted by the Tag and sends it back to Reader Layer 2 which decodes it, including checking the parity, and sends it to Reader Layer 3 if it is decoded successfully.

As FIG. 2 shows, a sequence of Layer 2 commands has been converted into a "transaction layer protocol" at Layer 3. The Layer 3 protocol, then, requires a specification of:
  The complete syntax of all commands.
  The tag action to occur in response to each command, including changes to one or more of the (virtual) 32-bit registers.
  The data that is to be broadcast by the tag and read by the reader, in particular, how the reader will know that the original command was successfully received and executed (e.g., copy the received command into one of the responding registers).
  Error handling at each step of each side of each transaction (e.g., restart the transaction if any error message is generated at the reader or tag along the way).
  The normal command sequence, including initiating and successfully terminating each Layer 3 transaction.

In one embodiment, the Layer 3 Transaction Protocol will consist of a 32-bit block that represents the command. The least significant eight bits (0-7) will include the parity bit checks (see below). The next four bits (8-11) will determine the command category: read, write or execute. The next 8 bits (12-19) will specify the data type. The following four bits (20-23) will be the index when required or 0 otherwise. The final 8 bits (24-31) are unused and will be set to 0. The last bit (31) will not be included in the parity check of the command.

To support applications with multiple tags, the Layer 3 protocol can include mechanisms to establish the identification of each tag and ensure that further communications are directed to that specific tag to complete a transaction.

In an exemplary embodiment, the Clear command will be implemented by setting the data values all equal 0. A separate Clear Command (as opposed to Read/Write) could also be used.

To minimize errors, the following design elements are recommended in the Layer 3 protocol. First, the command encodings should be selected so that there is at least a 2-bit difference between every possible command and data type combination. Secondly, setting values on the tag will require the tag to confirm the request and receive an acknowledgement to execute and actually change the data stored on the tag. Thirdly, the command will include 8 bits for an interleaved parity checking method (for a 32-bit command as described above). These bit definitions will be selected so that a single bit error can be detected and corrected. They will also allow 2 bit errors to be detected. Finally, bits that might be particularly prone to error will not be used (such as the last bit of a 32 bit block), at least in the command string portion of a transmission.

As the above description illustrates, when the tag receives a read request, it will prepare the requested data and begin transmitting it in a loop (see Step S8). It will continue to transmit the data for a specified period of time, (e.g. 30 seconds) or until another command request is received.

In an exemplary embodiment, the "read" command will precede the data to be returned. This allows the reader to confirm that the data the tag is transmitting is the data that the reader actually requested. A maximum returned data length limit will be set to 127 bits including parity data. In this way, a set number of parity bits can be used. The tag will add a parity byte (8 bits) to the end of the data; the parity byte checks the data but not the original command. The reader will confirm that the correct data was transmitted by matching the command read with the command sent, and by then checking the parity of the data. If an error is detected, the reader will try again, for a limited number of retries before reporting an error to the controlling application.

In addition, the data stored on the tag can be updated. To accomplish this, the Reader device must tell the tag what data element to change and what the new data value is. To confirm that the tag will perform the operation correctly, a command request—acknowledge—confirm protocol is applied. The original command request still uses the parity bits to provide additional error checking. So for instance, when the reader wishes to change settings on the tag (e.g. sensor limits, UID, etc.), the reader will first transmit the write request command with any required data. The parity byte will precede the command and will cover the command portion and data portion. The tag will confirm this command by transmitting it back in its entirety. When the reader confirms that the tag has received the correct command and data, it will transmit an execute request. The execute request will include the data type and index of the original write command. The tag may choose to use this additional information to further confirm that it should change the data. When the tag receives the execute request, it will then process the write request and change the appropriate data elements. For some commands, this may include setting additional values to 0.

Thus, if seven bits of parity ($2^7$=128) are used, a write command with 96 bits of data (for example, UID or Asset UID from the exemplary embodiment) and up to 31 bits of command information including the parity bits can be supported. One additional overall parity bit that will enable the detection of double bit errors is also included. That leaves 23 bits for constructing commands. Thus if an entire 32 bit block is used, ignoring one bit entirely, more than an adequate number of bits for specifying commands exist. Alternatively, if the hardware supports it, the command portion can be truncated to a byte boundary (probably 16 bits) to save a small amount of space. These type of data size tradeoffs are application-dependent.

In a preferred embodiment, each of the parity bits is defined as the sum of the target bits modulo 2 or simply, if the number of target bits that are 1 is odd, the parity bit is 1, otherwise it is 0. The mechanism to determine if a bit is wrong lies in how the parity bits are aligned with message bits.

Accordingly, a matrix M is constructed. The columns of the matrix when read as binary numbers are in numerical order from 1 to n. Then a top row of all 1's is added to the matrix. Now examining each row of the matrix, from bottom to top, each 1 indicates the message bit to include in the calculation of the parity. So M looks like:

are then read as a binary number which indicates the message position of an error. If the overall parity check does not fail, but other parity checks do, then this indicates that there is more than one error and the results cannot provide the location or message position of the error.

For example, suppose bit 2 is transmitted incorrectly. Then parity check 2 as well as the overall parity check will fail, giving the results: 1 0 0 0 0 0 1 0. Removing the overall parity bit leaves 0 0 0 0 0 1 0 or 2. Note that this is the same as the corresponding column values of M. The theory can be defined in terms of matrix multiplication with the transmitted message and received messages as vectors ($Mc^T$=0 when successful, or $M(c+e)^T=Mc^T+Me^T$ and $Me^T$=the syndrome, where c is the message, and e is the error message received). The above algorithm includes detecting an error transmitting the parity bits as well as the data bits themselves. (See Hamming, cited above.)

If a data message has fewer than 127 bits, then assume the unused bits are 0. When calculating the parity initially, the length of the message will be the length without the parity. The calculated parity bits are then appended to the data bits.

When receiving a message, the check can either include the parity bits, in which case the parity check result should always

| Bits 1-31 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 1 |
| 0 | 0 | 0 | 1 | 1 | 1 | 1 | 0 | 0 | 0 | 0 | 1 | 1 | 1 | 1 | 0 | 0 | 0 | 1 | 1 | 1 | 1 | 0 | 0 | 0 | 0 | 1 | 1 | 1 | 1 | 1 |
| 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

Continued (Bits 32-63)

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 1 |
| 0 | 0 | 0 | 1 | 1 | 1 | 1 | 0 | 0 | 0 | 0 | 1 | 1 | 1 | 1 | 0 | 0 | 0 | 1 | 1 | 1 | 1 | 0 | 0 | 0 | 0 | 1 | 1 | 1 | 1 | 1 |
| 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

Continued (Bits 64-95)

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 1 |
| 0 | 0 | 0 | 1 | 1 | 1 | 1 | 0 | 0 | 0 | 0 | 1 | 1 | 1 | 1 | 0 | 0 | 0 | 1 | 1 | 1 | 1 | 0 | 0 | 0 | 0 | 1 | 1 | 1 | 1 | 1 |
| 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

Continued (Bits 96-127)

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 0 | 0 | 0 | 0 | 0 | 0 | 0 | 1 | 1 | 1 | 1 | 1 | 1 | 1 | 1 | 1 | 1 |
| 0 | 0 | 0 | 1 | 1 | 1 | 1 | 0 | 0 | 0 | 0 | 1 | 1 | 1 | 1 | 0 | 0 | 0 | 1 | 1 | 1 | 1 | 0 | 0 | 0 | 0 | 1 | 1 | 1 | 1 | 1 |
| 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

When a message is received, the receiving device (reader or tag) recalculates the parity bit. If the parity bit matches what was sent in the original message, the parity check is successful or "passes" and is assigned a value of 0. If the check fails, it is assigned a value of 1. If the overall parity check results contain 1 (i.e., failed overall parity check), the remaining bits be 0, or keep the parity bits separate and compare the result. Either approach provides the same result.

The present invention is generally applicable to almost all RFID applications, and, when applied, can produce a quantifiable reduction in bit error rate in either or both the reader to tag or tag to reader channel. The ability to detect 2-bit errors and correct single-bit errors without retransmission of the signal is of particular benefit in RFID applications, and the "multi-rate sampling" aspect of interleaved parity computation is particularly robust to the missing/shifted bit types of errors encountered in RFID applications. For active RFID systems, and for multi-reader, multi-tag systems, the lengths of the "transactions" between readers and tags are longer than for passive systems, and the benefits of the interleaved parity are correspondingly greater, since the interruption of a transaction requires a re-start of the sequence, and frequently the manual intervention of the user. This in turn is another error source, and (due to the added time for manual intervention) also can be a significant loss in system efficiency (e.g., when scanned parts or parcels are on a moving conveyor or vehicle, so that the transaction must be completed in a limited time).

Further, rapid and efficient computation of parity signature and decoding "on the fly" as messages are received or transmitted is of particular benefit in RFID applications, where the field carrier detection and message encode/decode stages are strongly time-correlated. Both code and data storage requirements of the inventive method are very minimal, as is necessary in an RFID tag, and in some readers (e.g., PDA's or hand-held computers). The parity calculations could be implemented in hardware (e-PROM or gate array technology, for example) for further cost savings or improved speed. Also, enhancements to further protect against errors in receipt of the signature itself, such as multi-layer error handling strategy, can be added.

While the present invention has been described in particular embodiments, it should be appreciated that the present invention should not be construed as limited by such embodiments, but rather construed according to the below claims.

What is claimed is:

1. A method for improving the reliability of communication in an RFID system, said method comprising the steps of:
   computing on a first device a first interleaved parity code for a layer 3 transaction message;
   sending the layer 3 transaction message and the first interleaved parity code from the first device;
   receiving the layer 3 transaction message and interleaved parity code at a second device;
   computing on the second device, by a layer 2 of a layer protocol, a second interleaved parity code for the layer 3 transaction message
   comparing the first interleaved parity code and the second interleaved parity code by a layer 2 of a layer protocol; and
   based on the comparison, performing one of
   parsing and interpreting the layer 3 transaction message;
   detecting an error in the layer 3 transaction message and requesting a new message from the first device; and
   requesting a new message from the first device.

2. The method according to claim 1, wherein the first device is an RFID reader and the second device is an RFID tag.

3. The method according to claim 2, wherein writing onto the RFID tag requires the RFID tag to confirm a request for writing by transmitting the request back to the RFID reader and receive an acknowledgement to execute.

4. The method according to claim 2, wherein the RFID tag is an active tag.

5. The method according to claim 1, wherein the RFID system is a multi-reader system.

6. The method according to claim 1, wherein the RFID system is a multi-tag system.

7. The method according to claim 1, wherein based on the comparison, the performing step further includes correcting the layer 3 transaction message and parsing and interpreting the corrected message without transmitting a request for a new message or an indication of an error.

8. The method according to claim 1, wherein the error detected is in two bits of the layer 3 transaction message.

9. The method according to claim 1, wherein the first interleaved parity code further comprises a parity signature for the layer 3 transaction message where each bit of the signature is based on computing parity of selected bits of the layer 3 transaction message.

10. The method according to claim 1, wherein the layer 3 transaction message comprises command encodings having at least a two bit difference between each command and data type combination.

11. The method according to claim 1, wherein the layer 3 transaction message comprises one or more 32 bit blocks and a last bit of the one or more 32 bit blocks is not used.

12. The method according to claim 1, wherein the layer 3 transaction message comprises a command, and if the command requests data, the command and the data are returned.

13. A non-transitory computer readable medium having computer readable program code for causing a computer to execute a method of:
   computing on a first device a first interleaved parity code for a layer 3 transaction message;
   sending the layer 3 transaction message and the first interleaved parity code from the first device;
   receiving the layer 3 transaction message and interleaved parity code at a second device;
   computing on the second device, by a layer 2 of a layer protocol, a second interleaved parity code for the layer 3 transaction message;
   comparing the first interleaved parity code and the second interleaved parity code by a layer 2 of a layer protocol; and
   based on the comparison, performing one of:
   parsing and interpreting the layer 3 transaction message;
   detecting an error in the layer 3 transaction message and requesting a new message from the first device; and
   requesting a new message from the first device.

14. The non-transitory computer readable medium of claim 13, wherein the first device is an RFID reader and the second device is an RFID tag.

15. The non-transitory computer readable medium of claim 14, wherein writing onto the RFID tag requires the RFID tag to confirm a request for writing by transmitting the request back to the RFID reader and receive an acknowledgement to execute.

16. The non-transitory computer readable medium of claim 14, wherein the RFID tag is an active tag.

17. The non-transitory computer readable medium of claim 13, wherein the first device is an RFID reader and a RFID system is formed of at least a plurality of first devices.

18. The non-transitory computer readable medium of claim 13, wherein the second device is an RFID tag and a RFID system is formed of at least a plurality of second devices.

19. The non-transitory computer readable medium of claim 13, wherein based on the comparison, the performing step further includes correcting the layer 3 transaction message and parsing and interpreting the corrected message without transmitting a request for a new message or an indication of an error.

20. The non-transitory computer readable medium of claim 13, wherein the error detected is in two bits of the layer 3 transaction message.

21. The non-transitory computer readable medium of claim 13, wherein the first interleaved parity code further comprises a parity signature for the layer 3 transaction message where each bit of the signature is based on computing parity of selected bits of the layer 3 transaction message.

22. The non-transitory computer readable medium of claim 13, wherein the layer 3 transaction message comprises command encodings having at least a two bit difference between each command and data type combination.

23. The non-transitory computer readable medium of claim 13, wherein the layer 3 transaction message comprises one or more 32 bit blocks and a last bit of the one or more 32 bit blocks is not used.

24. The non-transitory computer readable medium of claim 13, wherein the layer 3 transaction message comprises a command, and if the command requests data, the command and the data are returned.

25. A system for improving the reliability of communication in an RFID system, said system comprising:
 a first device, using a layer 3 of a layer protocol, computing a first interleaved parity code for a layer 3 transaction message; and
 a second device, using a layer 2 of a layer protocol, computing a second interleaved parity code for the layer 3 transaction message, wherein said first device sends the layer 3 transaction message and the first interleaved parity code to the second device, the second device compares the first interleaved parity code and the second interleaved parity code by a layer 2 of a layer protocol and based on the comparison, the second device performs one of:
 parsing and interpreting the layer 3 transaction message;
 detecting an error in the layer 3 transaction message and requesting a new message from the first device; and
 requesting a new message from the first device.

26. The system according to claim 25, wherein the RFID system is a multi-reader system.

27. The system according to claim 26, wherein the RFID system is a multi-tag system.

28. The system according to claim 26, wherein the second device is an active tag and the first device is an RFID reader.

* * * * *